United States Patent [19]

Trebillon et al.

[11] 3,867,362

[45] Feb. 18, 1975

[54] METHOD OF TELOMERIZING

[75] Inventors: Emile Trebillon, Neuilly/Seine; Isidore Raitzyn, Paris, both of France

[73] Assignee: Rhone-Progil, Courbevoie, France

[22] Filed: June 27, 1973

[21] Appl. No.: 374,010

[30] Foreign Application Priority Data

June 29, 1972 France .............................. 72.23498

[52] U.S. Cl. ........ 260/91.7, 260/33.2 R, 260/92.8 R
[51] Int. Cl. .............................................. C08f 1/80
[58] Field of Search ......... 260/92.8 R, 87.7, 87.5 R, 260/92.8 R, 91.7

[56] References Cited
UNITED STATES PATENTS

| | | | |
|---|---|---|---|
| 2,647,107 | 7/1953 | Barnes .............................. | 260/78.5 |
| 2,964,508 | 12/1960 | Rector et al. ....................... | 260/87.7 |
| 3,019,215 | 1/1962 | Kroeper et al. ..................... | 260/94.9 |
| 3,054,785 | 9/1962 | Wade ................................. | 260/92.1 |
| 3,272,786 | 9/1966 | Perry ................................. | 260/88.7 |
| 3,334,081 | 8/1967 | Madgwick et al. ................. | 260/94.9 |
| 3,557,244 | 1/1971 | Schrage ............................. | 260/78.5 |

*Primary Examiner*—Stanford M. Levin

[57] ABSTRACT

The preparation of telomers or cotelomers of vinyl chloride and/or vinylidene chloride, with or without additional ethylenically unsaturated monomers and a telogen by heating the monomer composition in the presence of a ketone alcohol and an alcohol or acetonitrile solvent.

8 Claims, No Drawings

METHOD OF TELOMERIZING

This invention relates to a method for production of telomers or cotelomers of vinyl chloride or vinylidene chloride, and it relates more particularly to the catalytic system used in such a method.

Various methods are known which enable monomers having an ethylenic bond to be telomerized or cotelomerized with telogens, such as carbon tetrachloride or chloroform. In French Pat. No. 2,005,255, description is made of a method cotelomerizing a mixture of vinyl chloride and/or vinylidene chloride and a non-chlorinated vinylic monomer with a telogen, in the presence of a ferrous or ferric compound.

This process, yielding products having a low degree of telomerization, utilizes a process known as "redox-transfer," as described, for example, in an article by M. Assher and D. Vofsi, published in "Chemistry and Industry" dated Feb. 3, 1962, pages 209–210, and in the "Reports of the Academy of Sciences of the U.S.S.R."(1971), volume 198, No. 1, pages 102 to 104. Among the reducing compounds which may be used in conjunction with compounds of copper or iron, various substances, including benzoin and acetoin, have been mentioned.

It is an object of this invention to provide a process which, it is believed, limits the radical transfer mechanism and consequently enables solid telomers or cotelomers, white or slightly colored, to be obtained from a wide variety of monomers, and it is a related object to produce solid telomers or cotelomers which can easily be reduced to powder form.

In accordance with the practice of this invention, there is provided a method of telomerizing a monomeric composition comprising vinyl chloride or vinylidene chloride with a telogen, in which the composition is heated with the telogen in the presence of a ketone alcohol and an alcohol or acetonitrile as a solvent.

The ketone-alcohols which can be utilized are compounds having the general formula:

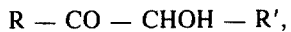

where R is an organic, aliphatic, cyclic, aromatic, alkyl aromatic or heterocyclic radical and R' is hydrogen or one of the R radicals, as described above. The ketone-alcohols are represented by benzoin and acetoin, with benzoin generally giving higher conversion rates.

Other reducing agents, such as aldehydes, when substituted for the ketone-alcohols, do not have noticeable catalytic effect under the operating conditions used in the process. Acyloin ether oxides have been found to give low conversion rates.

Comonomers which can be used with the vinyl chloride or vinylidene chloride are generally organic compounds having at least one ethylenic double bond in an aliphatic chain. The reactivity of these various compounds varies, depending somewhat upon the groups on either side of the double bond. Maleic acid or maleates, for example, give low conversion rates by comparison with those obtained with the chlorides of vinyl or vinylidene alone. It should be noted that compounds having conjugated double bonds, for example butadiene, have very little reaction. The molar ratio of vinyl chloride and/or vinylidene chloride to the total of the monomers is preferably at least 30 percent. A lower ratio frequently results in liquid cotelomers.

The telogens which may be utilized are generally compounds having a mobile halogen atom, such as the chlorinated, brominated, chlorobrominated, chlorofluorinated, bromo-fluorinated or chloro-bromofluorinated derivatives of methane or ethane, isobutyl bromide, the esters of di- and tri-chloracetic acid, benzyl chloride, and the chlorides of aromatic sulphonic acids.

As the solvents, use can be made of alcohols, preferably those capable of maintaining the reaction medium in a liquid phase at ambient temperature, and acetonitrile, with methanol giving particularly favorable results.

A preferred method of carrying out the invention comprises adding a free amine or preferably an amine hydrochloride to the reaction medium. The tertiary amines, and in particular their hydrochlorides, give the most favorable results.

Another preferred method of carrying out the invention consists of adding to the reaction medium, a salt or a complex of a metal selected from the group comprising the alkali metals, alkaline earth metals, magnesium, aluminum, titanium, manganese, cobalt, nickel, zinc, tungsten, molybdenum, mercury and lead. The salt may be a halide, phosphate, sulphate, or acetate, which may or may not be hydrated, and the complex may be a chelate complex.

The use of other additives in the form of metal compounds, such as those of iron or copper, generally yields telomers having low molecular weights in liquid form.

The highest conversion rates are obtained by utilizing both an amine and a compound of the metals listed above, in addition to the ketone alcohol. If a ketone-alcohol is absent, the conversion rate is negligible.

The molar ratio of the monomer or monomers to the alcohol is preferably within the range of 20:1 to 2,000:1.

The molar ratio of the monomer or monomers to the telogen is preferably within the range of 1:1 to 50:1.

The ratio by weight of the monomer or monomers to the alcohol is preferably within the range of 0.5:1 to 10:1.

The action of the amine addition becomes apparent when the molar ratio of the monomer or monomers to the amine is not more than 200:1.

The molar ratio of the monomer or monomers to the metal compound addition, referred to above, is preferably not more than 2000:1.

The reaction medium may be carried out in an autoclave under agitation so as to insure homogeneity of the reaction mixture (all of the constituents being liquid or dissolved when light alcohols such as methanol or ethanol are used), with the autoclave raised to the temperature required to enable the reaction to take place.

This reaction temperature, and also the pressure for telomerization, can vary within very wide limits depending upon the composition of the reaction medium and, in particular, the nature of the monomer. The reaction temperature is usually within the range of 60° to 200°C and the pressure within the range of 1 to 200 bars.

At the end of the reaction, the autoclave is generally cooled to ambient temperature. The unreacted gaseous products are recovered and the solid telomer may be separated by filtration from the liquid comprising the other ingredients of the reaction medium. The telomer may be washed with water or preferably with a light alcohol, such as methanol, followed by drying to constant weight at ambient temperature or slightly above, and then crushed. Crushing is generally very easy to carry out to yield a fine, white or slightly colored powder.

The telomers or cotelomers obtained are particularly suitable for preparing surface coatings, such as a varnish or paint. They are particularly easy to dissolve in solvents such as, for example, the mixture methyl ethyl ketone-toluene.

The following examples of preferred embodiments of the practice of this invention are given by way of illustration, but not by way of limitation:

EXAMPLE 1

Into a tube of borosilicate glass (20 mm in diameter), there is introduced in a first experiment, 1.5 millimoles of benzoin (0.32 g), and in a second experiment, 3 millimoles of acetoin (0.26 g). 75 millimoles of carbon tetrachloride (11.55 g) and 10 g of methanol are introduced in both experiments.

Each tube is cooled in a DEWAR flask containing a carbon dioxide-acetone snow mixture (−80°C). After purging with argon, 153 millimoles (9.6 g) of vinyl chloride are added.

The tube is sealed; its internal volume is then 100 cc. This tube is then placed in a pocket, having a diameter very slightly greater than its own external diameter, hollowed out in a block of aluminum.

This block is heated to 85°C and shaken by an appropriate device for 17 hours. After being restored to ambient temperature, the tube is cooled to −80°C and then opened carefully to allow the gaseous fractions to be released while being reheated slowly to ambient temperature.

The solid formed by the reaction is separated by filtration, then crushed in a porcelain mortar, in the presence of 50 cc of methanol. The acyloin is removed by methanol washing. The mixture obtained is placed on a filter and rinsed with water until neutral and the liquid phase is eliminated by suction exerted upon the filter. A small quantity of methanol is added to accelerate drying.

A white powder is obtained, which is soluble in tetrahydrofuran and possesses a mean molecular weight, as measured by vapor pressure osometry at 25°C of a solution of the powder in cyclohexane, of approximately 6,000. The weight of dry powder obtained is 1.15 g in the experiment in which benzoin is used and 0.25 g in the case where acetoin is used.

EXAMPLE 2

The procedure of Example 1 is followed, but using 3 millimoles of benzoin (0.64 g) and, in addition to the ingredients mentioned above, 9 millimoles of triethylamine hydrochloride (1.23 g). 5.9 g of a white powder having a molecular weight of the order of 4,000 are obtained.

EXAMPLE 3

The procedure of Example 1 is followed with the same ingredients in the same quantities, except that 1.5 millimole (0.13 g) of acetoin is used with the addition of 1.5 millimole of hexahydrated magnesium chloride (0.30 g).

After purification and crushing, 2.8 g of a white powder are obtained.

EXAMPLE 4

The procedure of Example 1 is followed, but utilizing 55 millimoles (10.5 g) of ethyl trichloracetate, 270 millimoles (26.2 g) of vinylidene chloride, 4.2 g of ethanol, 3 millimoles (0.64 g) of benzoin and 3 millimoles (0.61 g) of hexahydrated magnesium chloride.

After telomerization and the treatment previously described, 22.3 g of white powder were recovered, corresponding to a conversion rate of 85 percent.

EXAMPLE 5

Preparations analogous to those described above were carried out using, in an alcoholic solvent, the telogen, monomers, a metallic salt, benzoin and an amine hydrochloride. The compositions of the reaction media and the results obtained are given in Table I below.

In the preparations of Example 5, 75 millimoles of carbon tetrachloride were used as the telogen, with the exception of experiment c, where only 15 millimoles of this compound were used. The taxogen (monomer) was vinyl chloride; 153 millimoles were used in experiment a, 150 millimoles in experiments b, c, d, e and 155 millimoles in the other experiments. 9 millimoles of triethyl amine hydrochloride were used in all the experiments.

TABLE I

| EXPER. NO. | Benzoin mmoles | Metallic salts mmoles | Alcohol g | Weight Recovered g | Conversion rate %/CV | Appearance |
|---|---|---|---|---|---|---|
| a | 1.5 | $Cl_3Cr,6H_2O$ 1 | $CH_3OH$ 10 | 8.4 | 88 | White powder |
| b | 3 | $Cl_2Mg,6H_2O$ 3 | $CH_3OH$ 10 | 8.4 | 89 | White powder |
| c | 3 | $Cl_2Ca,6H_2O$ 3 | $CH_3OH$ 10 | 3.3 | 32 | White powder |
| d | 3 | $Cl_2Ni,6H_2O$ 3 | $C_4H_9OH$ 13.4 | 6 | 60 | Slightly colored powder |
| e | 3 | $Cl_2Ni,6H_2O$ 3 | $C_2H_5OH$ 10 | 5.5 | 55.5 | Slightly colored powder |
| f | 1.5 | $(CH_3CO_2)_2Ni,4H_2O$ 1.5 | $C_2H_5OH$ 10 | 7.6 | 78 | White powder |

TABLE I—Continued

| EXPER. NO. | Benzoin mmoles | Metallic salts mmoles | Alcohol g | Weight Recovered g | Conversion rate %/CV | Appearance |
|---|---|---|---|---|---|---|
| g | 1.5 | $SO_4Zn, 7H_2O$ 1.5 | $C_2H_5OH$ 10 | 2.5 | 26 | White powder |
| h | 1.5 | $Cl_2Ca$ 1.5 | $CH_3OH$ 10 | 8.2 | 85 | White powder |
| i | 3 | $Cl_2Co, 6H_2O$ 3 | $CH_3OH$ 10 | 5.2 | 55 | White powder |
| j | 3 | $Cl_2Mn, 4H_2O$ 3 | $CH_3OH$ 10 | 6.5 | 68 | White powder |
| k | 3 | $Cl_2H_u$ 3 | $CH_3OH$ 10 | 7.3 | 76 | White powder |
| l | 0 | $Cl_2Mg, 6H_2O$ 3 | $CH_3OH$ 10 | 0 | 0 | — |

EXAMPLE 6

The following constituents were introduced into a vitrified steel autoclave provided with an internal agitator and having a double jacket, after purging the autoclave with argon:

3.143 moles (479.6 g) of carbon tetrachloride,
6.40 moles (400.0 g) of vinyl chloride,
0.375 moles (51.7 g) of triethylamine hydrochloride,
0.062 mole (13.3 g) of benzoin,
0.046 mole (10 g) of hexahydrated chromium trichloride,
424 g of methanol The mixture was heated and stirred for 8 hours at 85°C. The initial pressure (at 85°C) was 8.9 bars. The pressure at the end of the operation was 2.5 bars.

After cooling, a solid was obtained which was pulverized in a ball crusher with 1,500 cc of methanol, then placed on a filter and washed twice with the same quantity of methanol and finally exposed as a thin layer to the air at 30°C.

By this method, 397 g of a white powder containing 58.9 percent by weight of chlorine were recovered.

EXAMPLE 7

The procedure of Example 6 was followed, but without adding triethylamine hydrochloride to the reaction medium and replacing the chromium salt by 0.061 mole (12.5 g) of hexahydrated magnesium chloride.

The reaction was continued for 12 hours. The initial pressure at 85°C was 9.2 bars and the final pressure 4.1 bars.

After the treatment described in the preceding Example, 371 g of a white powder, containing 58.3 percent by weight of chlorine, were recovered.

The molecular weight of the product obtained, measured by gel permeation chromatography, was of the order of 13,000.

It will be understood that changes may be made in the details of formulation and operation without departing from the spirit of the invention, especially as defined in the following claims.

We claim:

1. A method of telomerizing a monomeric composition comprising an unsaturated monomer selected from the group consisting of vinyl chloride and vinylidene chloride with a telogen which comprises heating the said composition in the presence of a ketone alcohol and a polar solvent selected from the group consisting of an alcohol and acetonitrile at a temperature within the range of 60°–200°C and at a pressure within the range of 1–200 bars, and in which the molar ratio of monomer to ketone alcohol is within the range of 20–2000.

2. A method as claimed in claim 1 in which the ketone alcohol is selected from the group consisting of benzoin and acetoin.

3. A method as claimed in claim 1 in which the composition contains at least one ethylenically unsaturated monomer wherein the molar ratio of vinyl chloride and/or vinylidene chloride to the total of the ethylenically unsaturated monomers is at least 30 percent.

4. A method as claimed in claim 1 in which the heating step is carried out in the presence of a compound selected from the group consisting of an amine and an amine salt.

5. A method as claimed in claim 4 in which the amine salt is a hydrochloride.

6. A method as claimed in claim 4 in which the amine is a tertiary amine.

7. A method as claimed in claim 1 in which the heat-step is carried out in the presence of a compound of a metal selected from the group consisting of an alkali metal, an alkaline earth metal, aluminum, titanium, manganese, cobalt, nickel, zinc, tungsten, molybdenum, mercury and lead.

8. A method as claimed in claim 7 in which the compound of the metal is in the form of an anion selected from the group consisting of a halide, phosphate, sulphate, acetate and chelate complex.

* * * * *